SUPPLY SYSTEM FOR A BURNER OF LIGHT HYDROCARBON-WATER EMULSIONS
Original Filed Dec. 1, 1971
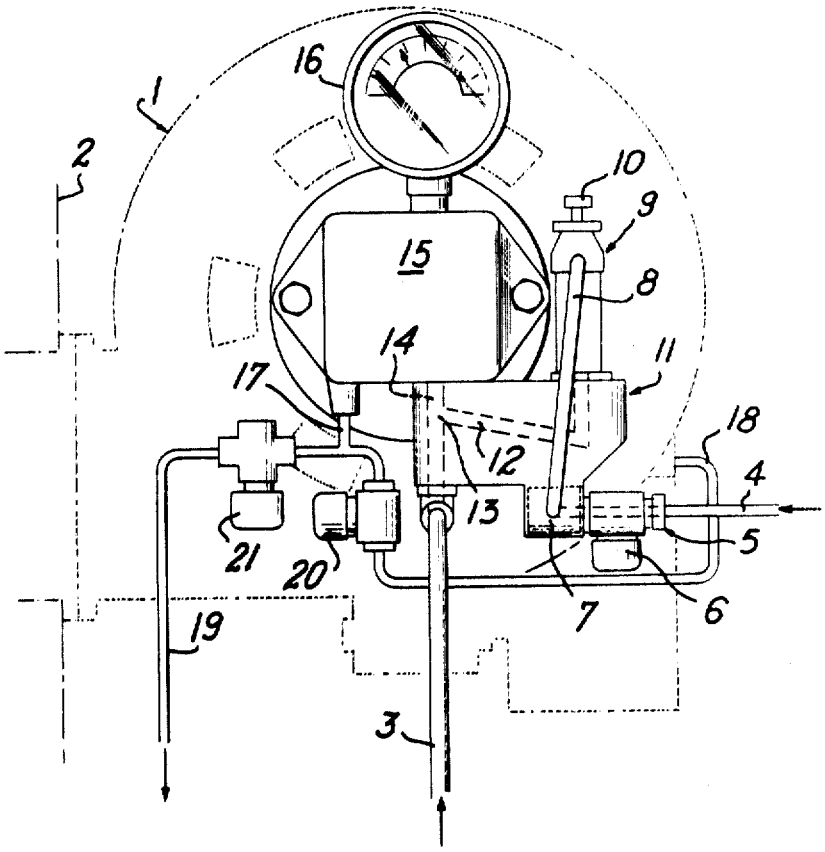

United States Patent Office

Re. 28,266
Reissued Dec. 10, 1974

28,266

SUPPLY SYSTEM FOR A BURNER OF LIGHT HYDROCARBON-WATER EMULSIONS

Claude Delatronchette, Cachan, France, by ELF-Union S.A., Paris, France, assignee Original No. 3,741,712, dated June 26, 1973, Ser. No. 203,756, Dec. 1, 1971. Application for reissue Sept. 5, 1973, Ser. No. 394,515
Claims priority, application France Dec. 7, 1970, 7043860
Int. Cl. F23l 7/00
U.S. Cl. 431—190 3 Claims

Matter enclosed in heavy brackets [ ] appears in the original patent but forms no part of this reissue specification; matter printed in italics indicates the additions made by reissue.

ABSTRACT OF THE DISCLOSURE

A supply system for burners adapted to consume an emulsion with water of light hydrocarbons, such as domestic fuel-oil for example, comprises in known manner, a water-supply intake, a hydrocarbon supply, a mixer for water and fuel, a high-pressure pump for sending said emulsion through an injection circuit to the injector of said burner, said supply system further comprising a dosing device for the injected water located on the water-supply circuit to said mixer, a first electro-valve and a non-return valve arranged at the input of the water-supply circuit, in front of said dosing device, a second electro-valve on the injection circuit, and a branch circuit connected on the injection circuit between the outlet of said high-pressure pump and said second electro-valve, said branch circuit being provided with a third electro-valve.

The present invention relates to burners for light hydrocarbons such as domestic fuel oil for example, which can be utilized in industrial or domestic heating installations and which use an emulsion of water and hydrocarbon as the fuel.

It is known that this existing technique provides a certain number of interesting advantages, such as a substantial reduction of the unburnt products and therefore the almost complete elimination of chimney sweeping, together with a reduction in the noise of operation and generally an improvement in the combustion.

More particularly, the present invention has for its object a supply system for burners of light hydrocarbons consuming an emulsion of water and hydrocarbon and compising in known manner a water intake, a hydrocarbon supply, a mixer of water and hydrocarbon which produces the emulsion to be burnt, together with a high-pressure pump for sending the said emulsion to the injector of the burner.

The supply system forming the object of the present invention is essentially characterized in that it comprises, in combination:

- A dosing device for the injected water, located on the supply circuit of the water to the mixer;
- A first electro-valve and a non-return valve mounted on the inlet of he water-supply circuit, in front of the dosing device;
- A second electro-valve on the injection circuit;
- A branch circuit on the injection circuit between the outlet of the high-pressure pump and the said second electro-valve, the said branch circuit being itself provided with a third electro-valve.

According to another characteristic feature of the present invention, before lighting the burner, the first and second electro-valves are closed and the third is opened.

Starting from the lighting of the burner, and during the entire operation of the apparatus, on the contrary the third electro-valve is closed while the first and second electro-valves are open.

According to another characteristic of the present invention, the dosing device utilized for injecting the desired quantity of water into the mixer is a drop-by-drop feed of known type, for example of the high-pressure type similar to those generally used as oil distributors for the lubrication of shafts of rotating machines.

In any case, the invention will be better understood by means of the description which follows below, relating to an example of application of a supply system of a burner for light hydrocarbons according to the invention. This description, which is not given in any limitative sense, refers to the single FIGURE of the accompanying drawing, which shows diagrammatically the main supply elements of a hydrocarbon burner utilizing the means according to the invention.

There can be seen in the drawing, the burner 1 of a type known per se fixed on the wall 2 of a boiler. In this example of application, the light hydrocarbon employed is domestic fuel which comes in through the pipe 3. The water used to produce the fuel emulsion passes into the system through the conduit 4 after having been filtered and, if necessary, expanded to a pressure valve compatible with the installation described.

On the water-intake circuit 4 there are successively mounted a non-return valve 5, a first electro-valve 6 which is normally closed, and a filter-box 7. A conduit 8 connects this box 7 to the dosing device 9 constituted according to the invention by a drop-by-drop over-pressure feed of a conventional type per se. This drop-by-drop over-pressure feed can have its flow-rate regulated by a screw 10. The mixer 11 comprises a conduit 12 connected to the dosing device 9 and delivering directly at 13 into the inlet fuel conduit 3. The conduit 14 resulting from the combination of the conduits 12 and 13 delivers into the high-pressure pump 15 equipped with its pressure-gauge 16.

The outlet 17 of the high-pressure pump communicates on the one hand with the conduit 18 connected directly to the injector of the burner (not shown in the figure) and on the other hand to a branch conduit 19 returning to the fuel-oil reservoir (not shown in the figure). The conduit 18 is provided according to the invention with a second electro-valve 20, which is normally closed, and the branch circuit 19 is provided with a third electro-valve 21 which is normally open.

In the present text there is to be understood by normally open (or normally closed) an electro-valve which is open (or closed) under conditions of rest, that is to say in the absence of any electrical excitation.

The operation of the device which has been described above is as follows:

At the moment of starting-up and during a period of about 30 seconds, the three electro-valves 6, 20 and 21 are at rest, namely in their "normal" position. The pump 15 is put into operation and sucks-in the fuel through the pipe 3, delivering it through the third electro-valve 21 (which is open) through the branch circuit 19 to the tank. This precirculation of the pure fuel has for its object to eliminate the possible remainder of a previous emulsion of water and fuel which may have remained in the burner and in the various conduits, and thus to permit the said burner to be lighted with pure fuel, which renders the operation much more reliable and much easier.

At the moment of lighting, the three electro-valves 6, 20 and 21 are excited. In consequence, the first, 6, is opened, as is also the second, 20: the third, 21, on the contrary is closed. The result is that the water coming-in through the conduit 4 passes successively through the non-return valve 5, the electro-valve 6, the filterbox 7, and passes through the pipe 8 into the dosing device 9. This dosing device then introduces it through the conduit 12 into the mixer 11, in which it meets at 13 the fuel drawn-in through the conduit 3. The emulsion of water and fuel is conveyed through the conduit 14 to the high-pressure pump 15. At the outlet of this pump 15, the emulsion of water and fuel passes through the second electro-valve 20 and is finally introduced through the conduit 18 into the injector of the burner (not shown in the figure).

What we claim is:

1. A supply system for a burner for light hydrocarbons utilizing an emulsion of water and light hydrocarbon comprising a water intake, a light hydrocarbon supply, a mixer of water and light hydrocarbon, a high-pressure pump forcing said emulsion through an injection circuit towards the injector of the burner a dosing device for the injected water, located in the supply circuit of water to said mixer;

a first normally open electro-valve closed during lighting of the burner and a non-return valve arranged to the input of the water-supply circuit, in front of said dosing device;

a second normally open electro-valve closed during lighting of the burner in the injection circuit;

and a branch circuit connected in the injection circuit between the outlet of said high-pressure pump and said second electro-valve, said branch circuit including a third normally closed electro-valve open during lighting of the burner.

2. A supply system for a burner for light hydrocarbons as claimed in claim 1, in which said water-dosing device is of the drop-by-drop over-pressure type, the flow-rate of which is adjustable by means of a screw.

3. A supply system for a burner for light hydrocarbons as claimed in claim 1, in which the water-intake system includes a filter-box.

References Cited

The following references, cited by the Examiner, are of record in the patented file of this patent or the original patent.

UNITED STATES PATENTS

| | | | |
|---|---|---|---|
| 3,677,296 | 7/1972 | Berger | 137—606 |
| 2,104,311 | 1/1938 | Russell | 431—4 |
| 2,033,010 | 3/1936 | Russell | 431—4 |

FOREIGN PATENTS

| | | | |
|---|---|---|---|
| 795,809 | 5/1958 | Great Britain | 431—4 |
| 1,290,984 | 3/1962 | France | 137—597 |

CHARLES J. MYHRE, Primary Examiner

W. C. ANDERSON, Assistant Examiner

U.S. Cl. X.R.

431—4; 137—565